US006876168B1

(12) United States Patent
Luo et al.

(10) Patent No.: US 6,876,168 B1
(45) Date of Patent: Apr. 5, 2005

(54) DISTURBANCE ATTENUATION IN A PRECISION SERVOMECHANISM BY A FREQUENCY-SEPARATED ACCELERATION SOFT SENSOR

(75) Inventors: Yaolong Luo, Singapore (SG); Tong Heng Lee, Singapore (SG); Shuzhi Ge, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 09/979,488
(22) PCT Filed: May 17, 2000
(86) PCT No.: PCT/SG00/00072
§ 371 (c)(1), (2), (4) Date: Mar. 21, 2002
(87) PCT Pub. No.: WO00/72314
PCT Pub. Date: Nov. 30, 2000

(30) Foreign Application Priority Data
May 20, 1999 (SG) .......................................... 9902415-0

(51) Int. Cl.[7] .......................... G05B 11/01; G05B 11/36; G05B 5/01; G05D 13/00
(52) U.S. Cl. ....................... 318/560; 318/609; 318/615; 318/623; 318/624; 318/651; 318/685
(58) Field of Search ...................... 318/560, 615–618, 318/623, 651

(56) References Cited

U.S. PATENT DOCUMENTS

| 3,697,992 A | * | 10/1972 | Kleptz et al. ................ 342/62 |
| 4,577,244 A | * | 3/1986 | El-Sadi ..................... 360/77.02 |
| 4,642,541 A | * | 2/1987 | El-Sadi ....................... 318/616 |

(Continued)

FOREIGN PATENT DOCUMENTS

| EP | 0139531 | 10/1984 | | |
| JP | 05189050 A | * | 7/1993 | ............ G05D/3/12 |
| JP | 10275003 A | * | 10/1998 | ........... G05B/13/02 |

OTHER PUBLICATIONS

Siri Weerasooriya, J.L. Zhang, T.S. Low, "Efficient Implementation of Adaptive Feedforward Runout Cancellation in a Disk Drive," IEEE Transactions in Magnetics, Sep. 1996, vol. 32, No. 5, pp. 3920–3922.

Yuhong Huang and William Messner, "A Novel Disturbance Observer Design for Magnetic Hard Drive Servo System with a Rotary Actuator", IEEE Transactions in Magnetics, Jul. 1998, vol. 34, No. 4, pp. 1892–1894.

Dr. BM Chen and A/P TH Lee, "Dual Actuator Control System Design for R/W Head Actuation in Rotating Memory Devices", Aug. 1997, pp. 1–2.

*Primary Examiner*—David Martin
*Assistant Examiner*—Patrick Miller
(74) *Attorney, Agent, or Firm*—Dinsmore & Shohl LLP

(57) ABSTRACT

In servomechanisms, like for example used in disk drives, disturbances, for example, friction, shock and vibration, prevent the system positioning accuracy from further improvement. These disturbances occur in a relatively low-frequency range compared to the electrical dynamics. In the present invention, an acceleration feedback control loop using a frequency-separated acceleration soft sensor (350) replaces the conventionally used current control loop in the low frequency range, where the disturbances occur, so as to attenuate the influence of the disturbances enclosed in the loop. The current feedback continues to manage the electrical dynamics in the high-frequency range. Estimating the required acceleration signal by a soft sensor (350) eliminates the need for physical accelerometers, which reduce system reliability and increase system cost. The acceleration feedback control loop constructed with the obtained acceleration signal also makes the system more robust to the parameter inaccuracies and variations within the loop. This invention can be easily implemented with either software or hardware.

7 Claims, 11 Drawing Sheets

U.S. PATENT DOCUMENTS

| | | | | | |
|---|---|---|---|---|---|
| 4,988,935 | A | * | 1/1991 | York | 318/568.18 |
| 5,159,254 | A | * | 10/1992 | Teshima | 318/611 |
| 5,184,055 | A | * | 2/1993 | Ohishi et al. | 318/615 |
| 5,256,951 | A | * | 10/1993 | Nashiki et al. | 318/575 |
| 5,304,905 | A | * | 4/1994 | Iwasaki | 318/561 |
| 5,313,147 | A | * | 5/1994 | Yoneda et al. | 318/569 |
| 5,467,001 | A | * | 11/1995 | Iwashita | 318/434 |
| 5,475,291 | A | * | 12/1995 | Yoshida et al. | 318/568.22 |
| 5,589,748 | A | * | 12/1996 | Kazama et al. | 318/560 |
| 5,623,189 | A | * | 4/1997 | Hemmer | 318/432 |
| 5,959,422 | A | * | 9/1999 | Kang | 318/561 |
| 5,994,864 | A | * | 11/1999 | Inoue et al. | 318/568.2 |
| 6,052,636 | A | * | 4/2000 | Lombardi | 701/50 |
| 6,211,636 | B1 | * | 4/2001 | Matsubara et al. | 318/434 |
| 6,243,226 | B1 | * | 6/2001 | Jeong | 360/78.07 |
| 6,308,106 | B1 | * | 10/2001 | Ameri et al. | 700/45 |

* cited by examiner

DISTURBANCE ATTENUATION IN A PRECISION SERVOMECHANISM BY A FREQUENCY-SEPARATED ACCELERATION SOFT SENSOR

BACKGROUND OF THE INVENTION

1. Field of the Invention

The present invention generally relates to servomechanisms. In particular, this invention relates to methods and systems to attenuate the influence of internal and external disturbances in low-frequency range, e.g., friction, shock and vibration, so as to further improve system positioning accuracy and increase the robustness of the servomechanisms.

2. Description of the Related Art

Problem to be Solved

Precision servomechanisms are finding more and more widespread applications such as mass data storage, stages for various key semiconductor fabrication processes as in step and repeat micro-lithography, wafer dicing, probing and scanning probe microscopy. For a system with high positioning accuracy requirement, some disturbances previously neglected or simplified usually in control system design must be taken into account and reconsidered. The disturbance is defined here as anything which causes a control system to leave its control goal. The disturbances preventing the system accuracy of a servomechanism from further improvement, for example in a hard disk drive of mass data storage, are mainly: (1) internal system nonlinearities, e.g., ribbon flexibility, windage, and friction of the bearing structure supporting the actuator, and (2) external disturbances, e.g., shock and vibration.

Friction, which depends on many factors such as asperity of the contacted surfaces, situation of lubrication and temperature, has two different presentations: pre-sliding friction and sliding friction. (See, for example, B. Armstrong-Hélouvry, P. Dupont, and C. Canudas de Wit, "A survey of models, analysis tools and compensation methods for control of machines with friction," Automatica, Vol. 30, No. 7, pp. 1083–1138, 1994.) In the pre-sliding stage, which is usually in the range of less than $10^{-5}$ m and dominated by the elasticity of the contacting asperity of surfaces, friction depends on both system position and velocity. Nonlinear dynamics such as hysteresis of friction to displacement and friction to velocity have been observed by many researchers. (See, for example, B. Armstrong-Hélouvry, P. Dupont, and C. Canudas de Wit, "A survey of models, analysis tools and compensation methods for control of machines with friction," Automatica, Vol. 30, No. 7, pp. 1083–1138, 1994; D. Abramovitch, F. Wang, and G. Franklin, "Disk drive pivot nonlinearity modeling part I: frequency domain," Proceedings of the America Control Conference. Baltimore, Md., June 1994, pp. 2600–2603; F. Wang, T. Hust, D. Abramovitch, and G. Franklin, "Disk drive pivot nonlinearity modeling part II: time domain," Proceedings of the America Control Conference, Baltimore, Md., June 1994, pp. 2604–2607; K. Eddy and W. Messner, "Dynamics affecting tracking bias in hard disk drive rotary actuators," Proceedings of the America Control Conference, Seattle, Wash., June 1995, pp. 1055–1060; and C. Canudas de Wit, H. Olsson, K. J. Astrom, and P. Lischinsky, "A new model for control of systems with friction," IEEE Transactions on Automatic Control., Vol. 40, No. 3, pp. 419–425, 1995.) In the sliding stage, friction is dominated by the lubrication of the contacting surfaces and has the function of system damping. Friction in the sliding stage can usually be represented by various single variable functions of velocity.

The problem of friction in servomechanisms has long been observed and researched. (See, for example, B. Armstrong-Hélouvry, P. Dupont, and C. Canudas de Wit, "A survey of models, analysis tools and compensation methods for control of machines with friction," Automatica, Vol. 30, No. 7, pp. 1083–1138, 1994.) Recently, this phenomenon receives much more attention due to the new challenges for high precision, for example, in hard disk drives. (See, for example, B. Armstrong-Hélouvry, P. Dupont, and C. Canudas de Wit, "A survey of models, analysis tools and compensation methods for control of machines with friction," Automatica, Vol. 30, No. 7, pp. 1083–1138, 1994; D. Abramovitch, F. Wang, and G. Franklin, "Disk drive pivot nonlinearity modeling part I: frequency domain," Proceedings of the America Control Conference, Baltimore, Md., June 1994, pp. 2600–2603; and F. Wang, T. Hust, D. Abramovitch, and G. Franklin, "Disk drive pivot nonlinearity modeling part II: time domain," Proceedings of the America Control Conference, Baltimore, Md., June 1994, pp. 2604–2607.) It has been found that friction, which is a dynamic nonlinear function of both system velocity and system position, lowers system gain in low frequency range, and it is difficult to obtain a complete friction model due to the complexity of friction.

For a servomechanism with a positioning accuracy in the range of micrometers, friction dynamics in the pre-sliding stage cannot be neglected in control system design. Friction introduces steady state error, tracking lag, and limit cycles in a servomechanism. For a positioning servomechanism, one of the most important tasks is to decrease system steady state error to improve the positioning accuracy. However, friction prevents system positioning accuracy from further improvement as it lowers system gain in the low-frequency range.

In addition, modern servomechanisms must be designed to perform satisfactorily to increasingly stringent specifications subject to external disturbances. This is particularly true for some positioning servomechanisms, for example, small hard disk drives. Small hard disk drives are inherently designed for portable applications. In a mobile environment, the hard disk drive must tolerate much more severe external disturbances such as shock and vibration than that which is experienced in the traditional hard disk drive environment. Therefore, external disturbances, such as shock and vibration, pose another challenge for system performance improvement.

Previous Solutions

Integral Control and Observer-Based Bias Compensation

In a Proximate Time-Optimal Servomechanism (PTOS), which is widely employed in positioning servomechanisms (as described, for example, in G. F. Franklin, J. D. Powell and M. L. Workman, Digital Control of Dynamic Systems, second edition, Addison-Wesley Publishing Company, 1990), the controller is switched from a bang—bang controller to a linear PD controller when the system position error is less than a predefined threshold. As the friction limits the system gain in the low frequency range, the PTOS control cannot satisfy the requirement for high precision in some servomechanisms. To solve this problem, the most commonly used techniques are: (1) the integral control, and (2) the observer-based compensation. It is well known that integral control in the positioning system with friction leads to limit cycles. (See, for example, B. Armstrong-Hélouvry, P. Dupont, and C. Canudas de Wit, "A survey of models, analysis tools and compensation methods for control of machines with friction," Automatica, Vol. 30, No. 7, pp.

1083–1138, 1994; and B. Armstrong and B. Amin, "PID control in the presence of static friction: a comparison of algebraic and describing function analysis," *Automatica*, Vol. 32, No. 5, pp. 679–692, 1996.) The observer-based compensation is developed under the assumption that the disturbance is a constant bias such that the derivative of the disturbance with respect to time is zero, which is the basic assumption for the design of the observer. (See, for example, G. F. Franklin, J. D. Powell and M. L. Workman, *Digital Control of Dynamic Systems*, second edition, Addison-Wesley Publishing Company, 1990.) However, this assumption is unrealistic for friction at the micrometer level, where the friction dynamics cannot be neglected.

Measured Acceleration Feedback

Utilizing acceleration feedback to improve system performance of a servomechanism is not new. For example in hard disk drives, Sidman (U.S. Pat. No. 5,426,545), Abramovitch (U.S. Pat. No. 5,663,847) and the related references cited in their patents proposed to use accelerometers mounted on the base plates of hard disk drives, with the sensed acceleration signals used to compensate for the disturbances on Read/Write (R/W) heads. However, in these patents, the sensed acceleration signal is the acceleration of the base plate rather than that of the R/W head since it is difficult and not feasible to mount accelerometers on the R/W head. Therefore, in this scheme, the effects of external shock and vibration on the R/W head are only indirectly sensed. Furthermore, the internal nonlinear disturbances to the R/W head, such as, friction, windage and ribbon flexibility, cannot be sensed and compensated for in this scheme. Moreover, the need for accelerometers makes this scheme expensive and complicated.

Estimators-based Compensation

Another scheme to reject the low-frequency disturbances including friction in a servomechanism is based on a disturbance estimator originally proposed by K. Kaneko et al, in "High stiffness torque control for a geared dc motor based on acceleration controller," *Proceedings of IECON'91*, pp. 849854. In this scheme, the low-frequency disturbances are estimated and compensated for using open-loop feedforward compensation. This method is sensitive to the accuracy and variations of the parameters in the loops because of the open-loop feedforward compensation.

In summary, there is no prior solution which can attenuate the influences of both internal disturbances such as friction and external disturbances such as shock and vibration for servomechanisms more effectively, more robustly, more simply and economically.

SUMMARY OF THE INVENTION

An object of the present invention is to provide a method and a system which can attenuate the influences of disturbances on the system performance of a positioning servomechanism.

It is also an object of the present invention to provide a method and a system which can overcome the gain decrease in low-frequency range resulting from friction, and remove the obstacle for further improvement of the positioning accuracy of servomechanisms.

Another object of the present invention is to provide a method and a system which can also attenuate the influence of the external shock and vibration for a positioning servomechanism.

A further object is to provide a method to attenuate the influence of disturbances more effectively, more robustly, and more simply and economically.

The foregoing objectives are accomplished by setting up an acceleration feedback control loop, which encloses the disturbances in the concerned frequency range. In particular, the following measures in the preferred embodiment of the present invention, a hard disk drive, are taken:

An acceleration feedback control loop is established to enclose the disturbances in the concerned frequency range.

The gain decrease in low-frequency range resulted from the internal disturbance, friction, is removed by the acceleration feedback control loop.

The effects of external disturbances, shock and vibration, are attenuated by the acceleration feedback control loop.

The fact that the acceleration signal in the acceleration feedback control loop is the directly estimated acceleration of the R/W head makes this invention more effective than the scheme using an accelerometer on the base plate of the hard disk drive.

The estimated acceleration signal sets up a closed acceleration feedback control loop such that the influences of not only disturbances but also the inaccuracies and variations of the parameters in the loop are both compensated for. This makes this invention more robust.

The acceleration signal is obtained by an acceleration soft sensor in the sense that the acceleration signal is obtained not by a direct measurement with physical accelerometers but by either a software algorithm or a hardware set which use only the commonly available system signals in a servomechanism such as current, velocity and/or position.

The acceleration control loop is frequency-separately integrated into the existing current control loop. The invention can be readily implemented in either software or hardware. Therefore, the invention is more economical and simpler.

BRIEF DESCRIPTION OF THE DRAWINGS

FIG. 8 shows the control performance with current and acceleration control loops, wherein

FIG. 9 presents the electrical dynamics of the positioning control with estimated acceleration feedback, wherein

FIG. 10 demonstrates the effectiveness of attenuating external vibration in the present invention, wherein

FIG. 11 demonstrates the effectiveness of attenuating external shock in the present invention, wherein

DETAILED DESCRIPTION OF THE PREFERRED EMBODIMENTS

The preferred embodiment of the present invention, positioning control of a hard disk drive servomechanism, is described in detail in this section. The positioning control of the read/write head of a hard disk drive actuator involves two functions: track seeking and track following. In the track seeking, the head is forced to move to the target track as quickly as possible, while in the track following, the head is positioned precisely at the target track.

PTOS Description

To satisfy both requirements for track seeking and track following, mode switching control strategies, e.g., Proximate Time-Optimal Servomechanism (PTOS), are widely employed in disk drive industry. (See, for example, G. F. Franklin, J. D. Powell and M. L. Workman, Digital Control of Dynamic Systems, second edition, Addison-Wesley Publishing Company, 1990). In the PTOS controller, a nonlinear control function causes the current amplifier to be saturated when the position error is larger than a predefined threshold to accelerate the target seeking, while the control changes to linear control after the position error is smaller than the threshold to eliminate the amplifier from chattering between the positive and negative maximum outputs.

Figure 1:
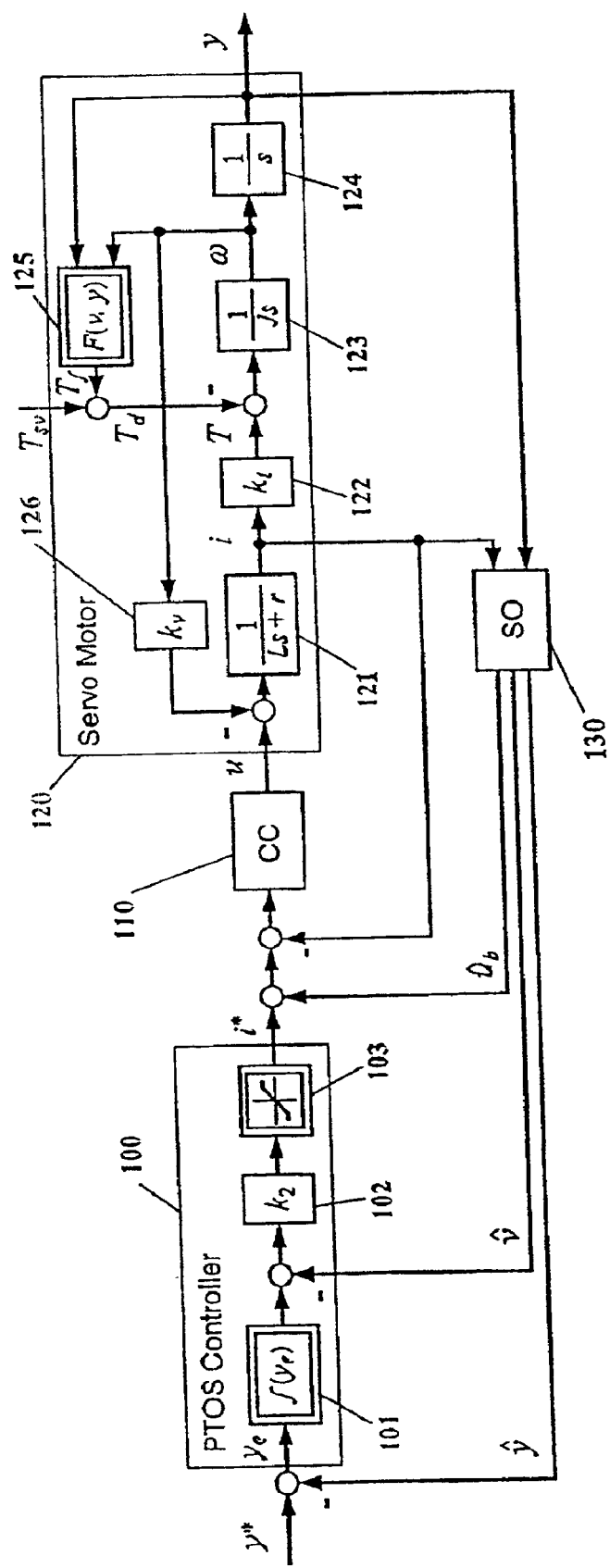
FIG. 1 is the schematic diagram of proximate time-optimal servomechanism for the preferred embodiment of the present invention, a hard disk drive.

FIG. 1 shows a block diagram of the PTOS control of a hard disk drive, where y, y*, ŷ, and ŷ are the actual, desired, reference and observed positions respectively; v, v* and v̂ are the actual, desired and observed velocities respectively; $y_e$ is position error, and û is the observed disturbance bias. The PTOS controller 100 provides the reference current to the current control loop. The Current Controller (CC) 110 provides the voltage command to the Voice Coil Motor (VCM) 120. The State Observer (SO) 130 is used to construct the necessary variables for the PTOS controller 100 since only the position and current are measurable in a hard disk drive. In the PTOS controller 100, a nonlinear function $f(y_e)$ 101 of position error $y_e$ manipulates the switching mode to provide the reference velocity to the velocity control loop. The velocity control loop having gain $k_2$ 102 and a saturation function 103 with limits $\pm I_m$ provide the reference current to the current control loop. In the VCM block 120, the voltage u is subtracted from the back EMF, which is the product of system velocity ω0 and the EMF constant $k_v$, to produce current i through a first-order delay element 121, where L and r are the inductance and resistance of the VCM. The VCM produces a drive torque T through the current i multiplying a torque constant $k_t$ 122. The drive torque T is subtracted from the disturbance torque $T_d$, which is the sum of the internal system nonlinearity F(v, y) and the external disturbance $T_{sv}$. The difference acts as the input to the mechanical dynamics represented by an integrator 123 with inertia J and an integrator 124. The system nonlinearity 125 represents friction, windage, ribbon flexibility, etc., which is a function of system velocity and position. The constant $k_v$, 126 represents the back-EMF factor of the VCM 120. The SO 130 provides also an observed signal $\hat{u}_b$ which is used to compensate for the disturbance.

The nonlinear function $f(y_e)$ 131 is mathematically described by:

$$f(y_e) = \begin{cases} \frac{k_1}{k_2} y_e, & |y_e| \leq y_l, \\ \text{sgn}(y_e)\left(\sqrt{\frac{2\alpha I_m}{J}|y_e|} - \frac{I_m}{k_2}\right), & |y_e| > y_l. \end{cases} \quad (1)$$

To ensure the continuity of the system state during the switching between control modes, the position gain $k_1$ and velocity gain $k_2$ 132 have the relationship:

$$k_2 = \sqrt{\frac{2k_1 J}{\alpha}}. \quad (2)$$

The position error threshold is given by:

$$y_l = \frac{I_m}{k_1}. \quad (3)$$

In the design of a PTOS, after selecting the factor 0<α<1, the gain $k_1$ is chosen according to the system performance requirement, and the gain $k_2$ is determined from Equation (2). The function $f(y_e)$ can subsequently be determined according to Equation (1).

Operation Theory of the Invention

Figure 2A:
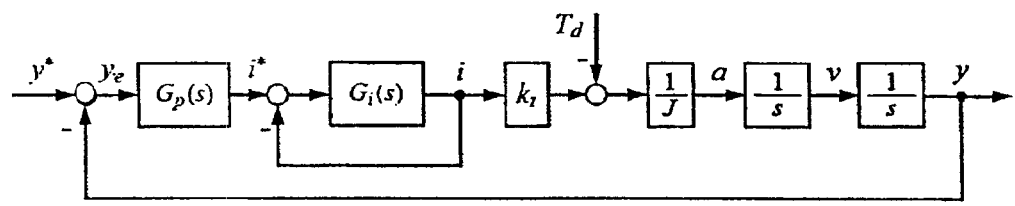
FIG. 2 is the schematic diagrams of servomechanisms with current and acceleration control loops, wherein FIG. 2(*a*) shows a simplified system with current loop, FIG. 2(*b*) shows a simplified system with an acceleration loop, and FIG. 2(*c*) shows a simplified system with feedforward disturbance compensation.

FIG. 2(a) shows a simplified positioning control system of HDD in the PTOS with a current loop at the last stage when the position error is less than the threshold, where $G_p(s) = K_P + K_D s$ is the position controller, which is a PD controller; and $G_i(s)$ is the equivalent open-loop transfer function in the current loop. The system error is described by the transfer function:

$$Y_e(s) = \frac{J(1+G_i)s^2}{J(1+G_i)s^2 + K_D G_i k_t s + K_P G_i k_t} Y^*(s) + \frac{1+G_i}{J(1+G_i)s^2 + K_D G_i k_t s + K_P G_i k_t} T_d(s). \quad (4)$$

The steady-state error due to the disturbance is:

$$\lim_{t \to \infty} Y_e(t) = \lim_{s \to 0} sY_e(s) = \frac{1+G_i}{K_P G_i k_t} \approx \frac{1}{K_P k_t}, \text{ as } G_i \gg 1. \quad (5)$$

Figure 2B:
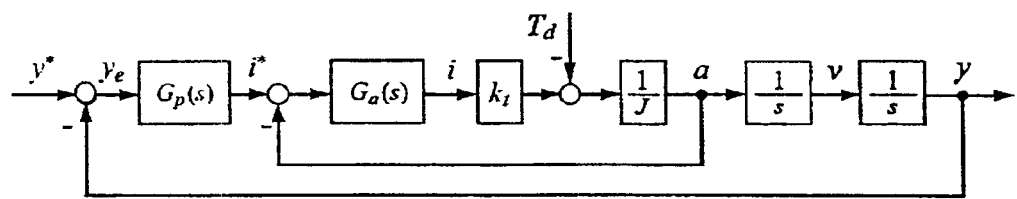

FIG. 2(b) shows the simplified system with an acceleration control loop. The system error under the influence of the disturbance $T_d$ is now:

$$Y_e(s) = \frac{(J + G_a k_t)s^2}{(J + G_a k_i)s^2 + K_D G_a k_t s + K_P G_a k_t} Y^*(s) + \quad (6)$$

$$\frac{1}{(J + G_a k_t)s^2 + K_D G_a k_t s + K_P G_a k_t} T_d(s).$$

The steady-state error due to the disturbance is now:

$$\lim_{t \to \infty} Y_e(t) = \lim_{s \to 0} sY_e(s) = \frac{1}{K_P G_a k_i}, \quad (7)$$

which is reduced by a factor of $1/G_a$, where $G_a$ is the gain of the acceleration control loop. In the ideal case, if the acceleration loop is perfectly designed, that means, a*=a and $G_a = \infty$. The disturbances have no influence on the system. Since the gain of the acceleration control loop cannot be infinite in practice, the influence of the disturbances cannot be totally removed, but can be attenuated to a certain degree subject to the acceleration control loop design.

Figure 2C:
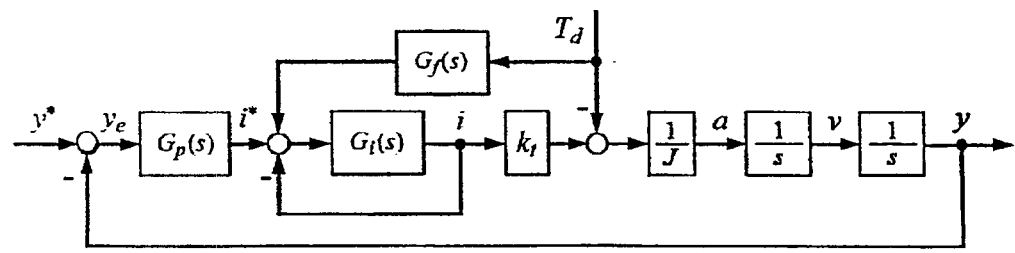

In FIG. 2(c), the influence of the disturbance torque $T_d$ is measured or estimated and compensated for with a feedforward loop with the transfer function $G_f(s)$. The system error is now:

$$Y_e(s) = \frac{J(1 + G_i)s^2}{J(1 + G_i)s^2 + K_D G_i k_t s + K_P G_i k_t} Y^*(s) + \quad (8)$$

$$\frac{1 + G_i - G_f G_i k_t}{J(1 + G_i)s^2 + K_D G_i k_t s + K_P G_i k_t} T_d(s).$$

If $G_f(s)$ is designed such that $G_f(s)=(1+G_i(s))/(G_i(s)k_t)$, the influence of the disturbance torque $T_d$ can be completely compensated for. However, since $k_t$ and the parameters in $G_i(s)$ may change with the operation environment in practice, it is difficult to implement an exact $G_f(s)$ for the complete compensation. Therefore, the influence of the disturbance remains in this scheme. However, as long as the gain of the acceleration feedback control loop is relatively high, the system with acceleration feedback control loop is robust to the changes of $k_t$ and the other parameters in $G_a(s)$, as can be seen from Equation (7).

Acceleration signal can be obtained by physical accelerometer measurement or by estimation in hardware or software based on the available system outputs. The use of accelerometers reduces the system reliability and increases the system cost. The direct way to obtain an acceleration signal by estimation is to differentiate the system variables of the velocity signal or position signal. However, a derivative element in electrical drive systems leads to significant noise. These inspired the invention below.

Structure of the Invention

Figure 3:
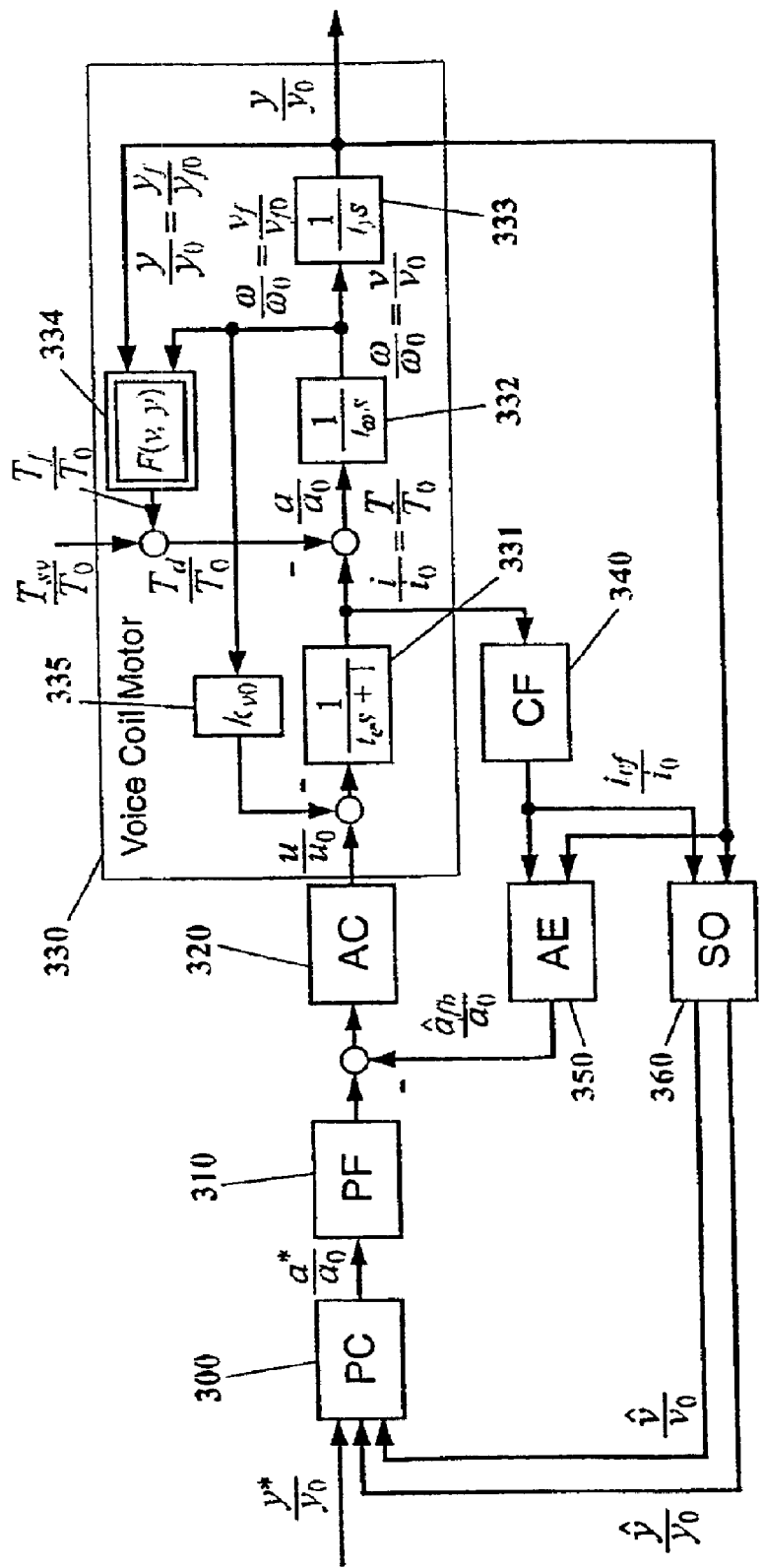
FIG. 3 schematically shows the preferred embodiment of the present invention.

FIG. 3 is an overall drawing of a preferred embodiment of the invention, in which all variables are normalized by the reference values:

| | | |
|---|---|---|
| $i_0 = i_m$ | (A) | nominal current set to be the maximum current |
| $u_0 = i_0 r$ | (v) | nominal voltage |
| $T_0 = i_0 k_t$ | (Nm) | nominal torque |
| $y_0$ | (m) | nominal linear position |
| $\omega_0$ | (s$^{-1}$) | nominal angular velocity |
| $z_0$ | (m) | nominal value for the variable z in the bristle model of friction |
| $\alpha_0 = T_0/J$ | (s$^{-2}$) | nominal angular acceleration |
| $v_0 = R\omega_0$ | (m/s) | nominal linear velocity of the R/W head |
| $v_{j0} = r_b \omega_0$ | (m/s) | nominal linear velocity of the pivot bearing |
| $y_{j0} = R|(r_b y_0)$ | (m) | nominal linear position of the pivot bearing |

The normalization results in the following non-dimensional system equations:

$$t_e \frac{d}{dt}\left(\frac{i}{i_0}\right) = \frac{u}{u_0} - \frac{i}{i_0} - k_{v0}\left(\frac{\omega}{\omega_0}\right), \quad t_e = \frac{L}{r} \quad (9)$$

$$\frac{i}{i_0} = \frac{T}{T_0} \quad (10)$$

$$\frac{T}{T_0} - \frac{T_d}{T_0} = \frac{a}{a_0} \quad (11)$$

$$t_\omega \frac{d}{dt}\left(\frac{\omega}{\omega_0}\right) = \frac{a}{a_0}, \quad t_\omega = \frac{\omega_0}{a_0} \quad (12)$$

$$\frac{\omega}{\omega_0} = \frac{v}{v_0} \quad (13)$$

$$\frac{\omega}{\omega_0} = \frac{v_f}{v_{f0}} \quad (14)$$

$$\frac{y}{y_0} = \frac{y_f}{y_{f0}} \quad (15)$$

$$t_y \frac{d}{dt}\left(\frac{y}{y_0}\right) = \frac{v}{v_0}, \quad t_y = \frac{y_0}{v_0} \quad (16)$$

The output of a PTOS Controller (PC) 300 is filtered by a Pre-Filter (PF) 310 as the reference input to the acceleration control loop. The difference between the output of PF 310 and the estimated acceleration signal for feedback ($\hat{a}_{fb}/a_0$) from an Acceleration Estimator (AE) 350 acts as the input of the Acceleration Controller (AC) 320. In the VCM 330, the electrical dynamics between the voltage subtracting back-EMF and current are now described by a first-order delay element 331 with electrical time constant $t_e$. The mechanical dynamics is now described by two integrators 332 and 333 with time constant $t_w$ and $t_y$ respectively. The system nonlinearity 334 is assumed here as an example to be pivot friction of the bearing, which is a function of pivot velocity and pivot position. An Acceleration Estimator (AE) 350 receives two inputs: the position signal and the current signal through a Current Filter (CF) 340. A State Observer (SO) 360 also receives the two inputs. The outputs of the State Observer (SO) 360 provide inputs to the PTOS Controller (PC) 300.

Figure 4A:
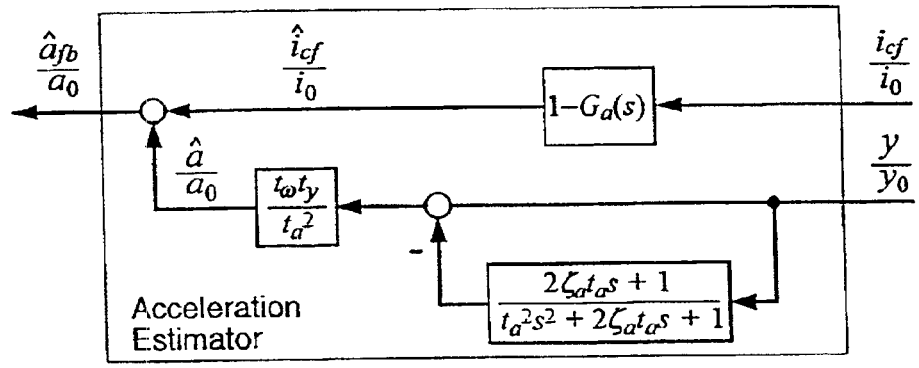
FIG. 4 shows acceleration estimation and frequency separation, wherein FIG. 4(*a*) shows a frequency-separated acceleration soft sensor, and FIG. 4(*b*) shows the frequency separation of acceleration feedback and current feedback.

FIG. 4(a) shows the idea of the acceleration estimation without derivatives, where $G_a(s)$ is a second-order low-pass filter with transfer function:

$$G_a(s) = \frac{1}{t_a^2 s^2 + 2\zeta_a t_a s + 1}, \quad (17)$$

which has two design parameters: $\zeta_a$ is the damping coefficient, and $t_a$ is the turn-over or separation frequency $1/t_a$. Therefore:

$$\frac{\hat{a}}{a_0} = \frac{t_w t_y}{t_a^2} \frac{t_a^2 s^2}{t_a^2 s^2 + 2\zeta_a t_a s + 1}\left(\frac{y}{y_0}\right) = G_a(s)\left(\frac{a}{a_0}\right). \quad (18)$$

The feedback acceleration signal is:

$$\frac{\hat{a}_{fb}}{a_0} = \frac{\hat{a}}{a_0} + \frac{\hat{i}_{cf}}{i_0} = G_a(s)\left(\frac{a}{a_0}\right) + (1 - G_a(s))\left(\frac{i_{cf}}{i_0}\right). \quad (19)$$

Figure 4B:
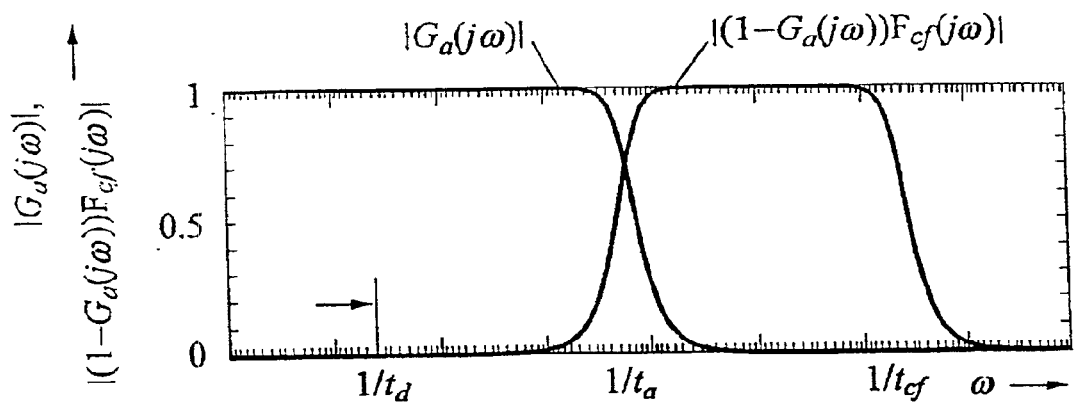

Conventionally, the acceleration control loop is inserted between the inner current loop and the outer velocity loop in the servo systems with high performance requirement. However, considering that each inner loop should have a higher bandwidth five to ten times the bandwidth of its outer loop in cascaded control, the insertion of the acceleration loop lowers the bandwidth of the whole system. Therefore, the response speed of the system is affected, which is very important in the HDD servo systems. In this invention, the current and acceleration loops are combined. Since the acceleration estimator only has output in the low-frequency range, the current feedback is still employed in the high-frequency range and the two feedback signals switch continuously in the frequency-domain as shown in FIG. 4(b), where $F_{cf}(s)$ is the transfer function of the current filter, $F_{cf}(s)=1/(t_{cf}s +1)$, $1/t_{cf}$ is the turn-over frequency of the current filter, and $1/t_d$ is the upper limit of the disturbance frequency subject to the condition, $1/t_d<1/t_a<1/t_{cf}$.

Design of the Acceleration Feedback Control Loop

Figure 5A:
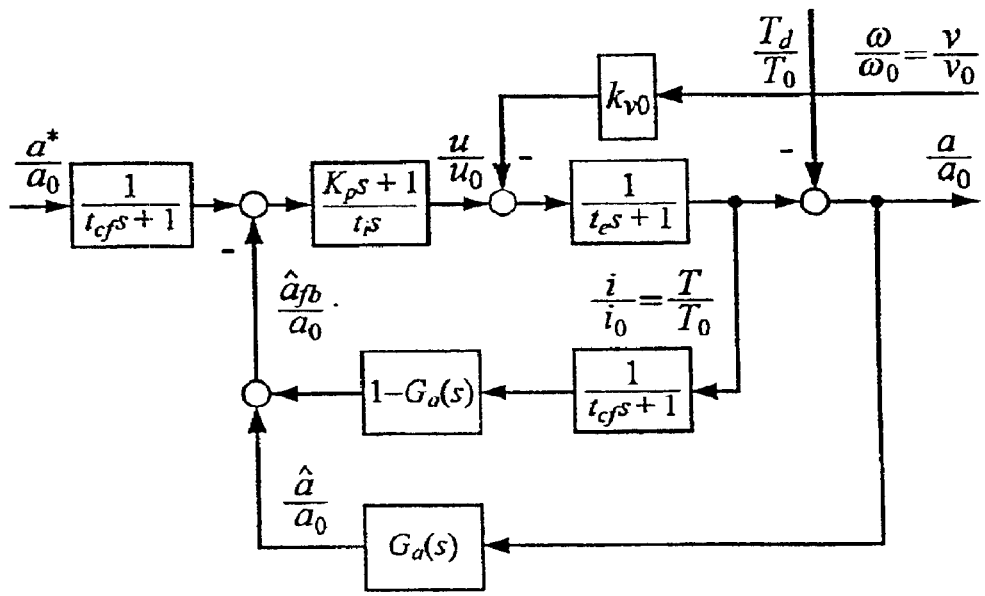
FIG. 5 shows the design of the acceleration feedback loop, wherein FIG. 5(*a*) shows an equivalent structure of an acceleration loop, FIG. 5(*b*) shows a simplified acceleration loop, and FIG. 5(*c*) shows a controller design in the acceleration loop.

FIG. 5(a) shows the design of a PI acceleration controller with parameters $K_p$ and $t_i$. Since the electrical dynamics is much faster than the change of mechanical velocity, the effect of the EMF can be ignored at the design stage. The operation of the acceleration estimator is analyzed as follows:

1. When $\omega \leq 1/t_d$: $G_a(s)=1$; $(1-G_a(s))=0$; and $F_{cf}(s)=1$.
   Thus, $(\hat{a}_{fb}/a_0)=(a/a_0)F_{cf}(s)$.
2. When $1/t_d<\omega \leq 1/t_{cf}$: $T_d=0$ and $F_{cf}(s)=1$.
   Thus, $(i/i_0)=(a/a_0)$ and $(\hat{a}_{fb}/a_0)=(a/a_0)F_{cf}(s)$.
3. When $\omega>1/t_{cf}$: $T_d=0$ and $F_{cf}(s)=0$.
   Thus, $(i/i_0)=(a/a_0)$ and $(\hat{a}_{fb}/a_0)=(a/a_0)F_{cf}(s)$.

Figure 5B:
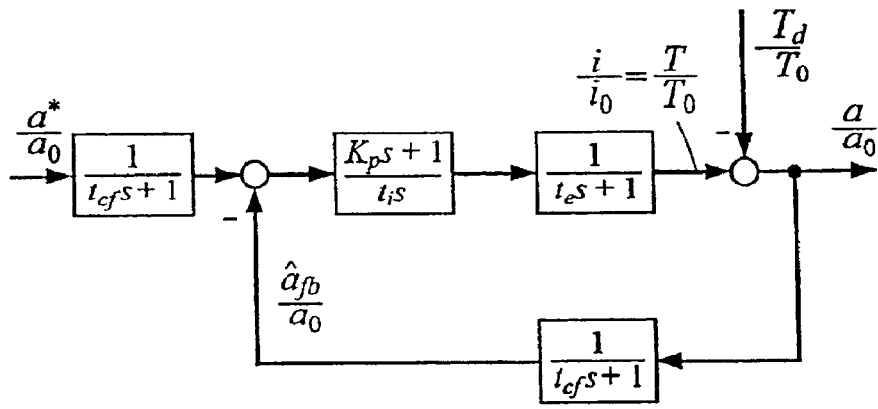
Figure 5C:
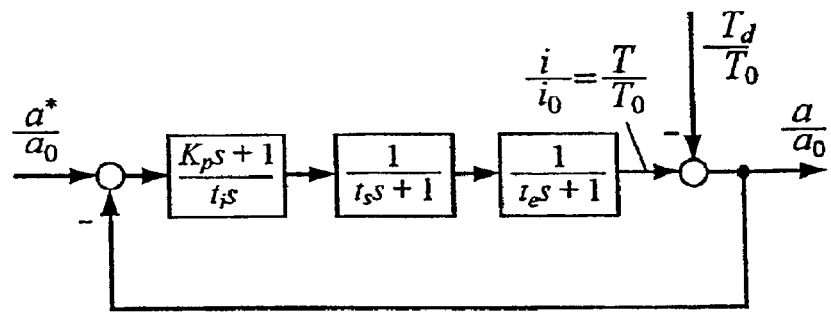

Therefore, $(\hat{a}_{fb}/a_0)$ is always equal to $(a/a_0)F_{cf}(s)$. The acceleration control loop with the estimated acceleration feedback is equivalent to the block diagram shown in FIG. 5(b). Furthermore, with a pre-filter, the control loop can be simplified to FIG. 5(c), where $t_s$ is the sum of all the small time constants $t_{cf}$, $t_g$ and perhaps also the time delay of the required A/D and D/A converters. (See, for example, F. Fröher and F. Orttenburger, *Einführung in die elektronische Regelungstechnik*, Siemens Aktiengesellschaft, 1970. English Translation, *Introduction to Electronic Control Engineering*, Heyden & Son Ltd., London, 1980.)

Figure 6:
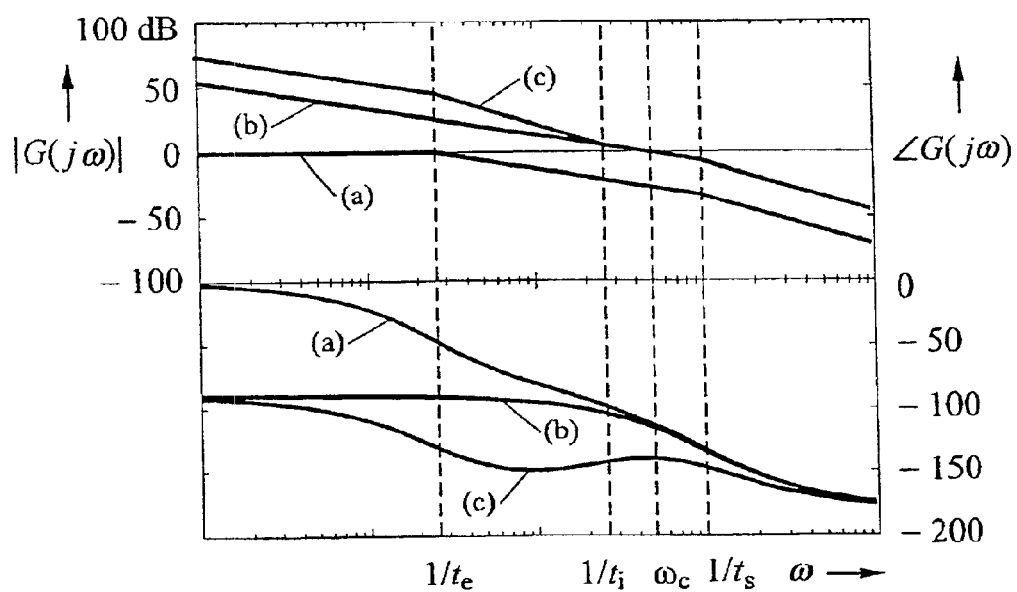
FIG. 6 shows the open-loop frequency characteristics for the design of the acceleration loop, wherein the pair of curves (a) illustrate the open-loop frequency characteristics without an acceleration controller, the pair of curves (b) illustrate an acceleration control loop designed to be a type-I servo system; and the pair of (c) illustrate an acceleration control loop is designed to be a type-II servo system.

FIG. 6 shows the open-loop frequency characteristics of the acceleration control loop, where curve (a) denotes the plant open-loop frequency characteristics. One simple way to design the acceleration controller is to set the zero of the acceleration controller at the pole of the large time constant so that the acceleration loop works as a type-I servo system:

$$\begin{cases} t_i = t_e, \\ K_p = 0.5\left(\frac{t_e}{t_s}\right). \end{cases} \quad (20)$$

The open-loop frequency characteristics of the plant with this controller has the shape indicated by curve (b) in FIG. 6.

If the condition, $t_e \geq 10\, t_s$, is held, the acceleration controller can be designed according to the optimal symmetry method (as described, for example, by F. Fröher and F. Orttenburger, *Einführung in die elektronische Regelungstechnik*, Siemens Aktiengesellschaft, 1970. English Translation, *Introduction to Electronic Control Engineering*, Heyden & Son Ltd., London, 1980.) so that the acceleration loop works as a type-II servo system:

$$\begin{cases} t_i = 4t_s, \\ K_p = 0.5\left(\frac{t_e}{t_s}\right). \end{cases} \quad (21)$$

As shown by the curves denoted by (c) in FIG. 6, there is now a larger gain in the low-frequency range than the above design. At the cost, the phase margin is relatively smaller.

An Exemplary Implementation of the Invention

The invention can be readily implemented in either hardware or software. If the invention is implemented in hardware, the transfer function $G_a(s)$ and $(1-G_a(s))$ can be realized by either active filters or non-resource R–L networks without any difficulty in the field of the art. The existing current controller in the power amplifier can be used as the acceleration controller with some parameter adjustment according to the design principles described above. If the invention is to be implemented in software, the time delays of the A/D and D/A converters should be taken into account as the small time constants to become parts of the time constant $t_s$ in the design of the acceleration controller.

According to the design methodology of a cascaded control system, the completed acceleration control loop can be simplified to a first-order delay element into the design of the outer velocity and position control loops. (See, for example, F. Fröher and F. Orttenburger, *Einführung in die elektronische Regelungstechnik*, Siemens Aktiengesellschaft, 1970. English Translation, *Introduction to Electronic Control Engineering*, Heyden & Son Ltd., London, 1980.)

Simulation Investigation of the Invention

Numerical simulations on a hard disk are carried out to verify the effectiveness of the invention. In the simulation, the internal system nonlinearity is represented by pivot friction of the bearing with the bristle friction model:

$$\begin{cases} F = \sigma_0 z + \sigma_1 \dfrac{dz}{dt} + \sigma_2 v, \\ \dfrac{dz}{dt} = -\dfrac{|v|}{g(v)} z = v, \\ \sigma_0 g(v) = F_C + (F_S - F_C)e^{-(v/v_s)^2}, \end{cases} \quad (22)$$

where z(t) describes the average deflection of the bristles, and g(v) is a positive function depending on many factors such as, for example, material properties, lubrication and temperature. The factors $\sigma_0$, $\sigma_1$ and $\sigma_2$ are stiffness, damping and viscous friction coefficients respectively, $v_s$ is the Stribeck velocity, $F_C$ is the Coulomb friction level and $F_S$ is the level of stiction friction. This friction model, which captures most of the friction behaviors, was proposed in C. Canudas de wit, H. Olsson, K. J. Astrom, and P. Lischinsky, "A new model for control of systems with friction," *IEEE Transactions on Automatic Control.*, Vol. 40, No. 3, pp. 419–425, 1995.

Figure 7A:
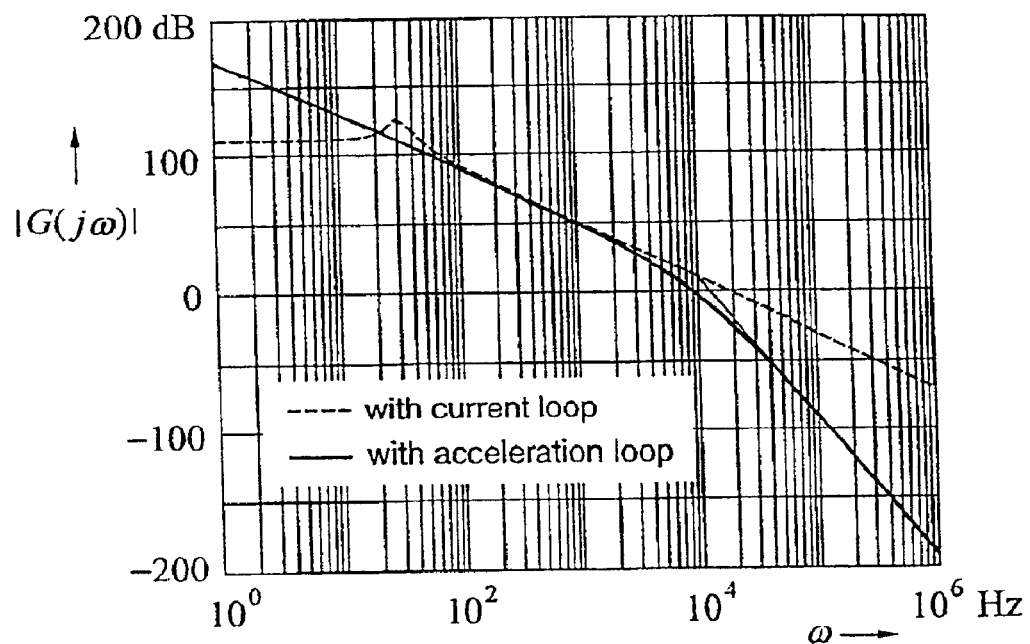
FIG. 7 shows the simulation results of the frequency characteristics of the system with current loop and acceleration loop, wherein the graph in FIG. 7(a) shows the improvement of system gain by an acceleration loop in a low frequency range, and the graph in FIG. 7(b) shows the improvement of system robustness.
Figure 7B:
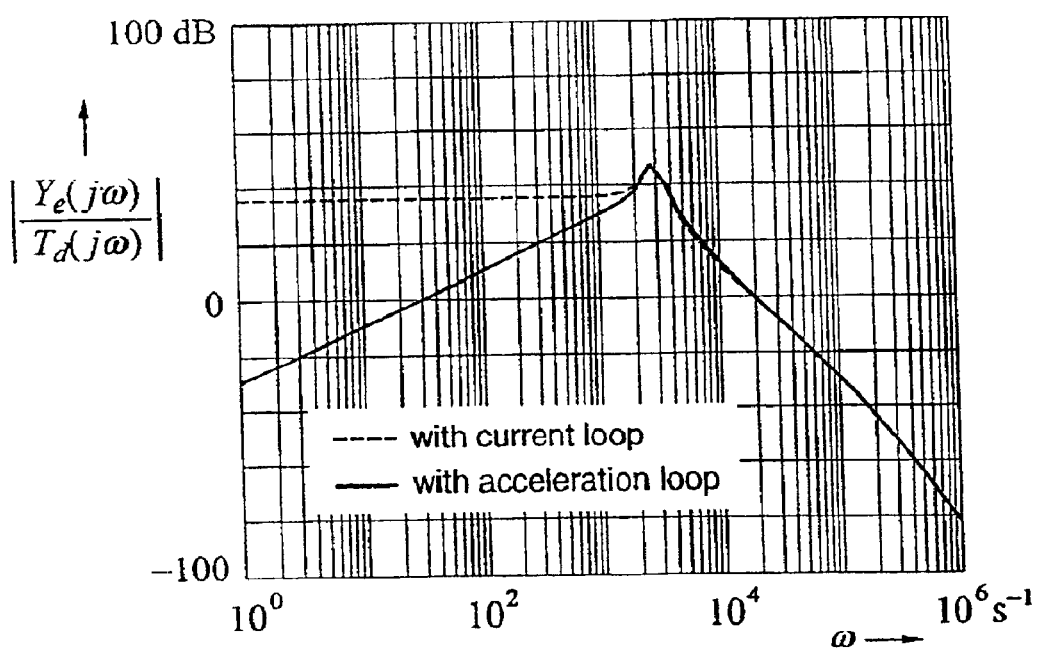
Figure 8A:
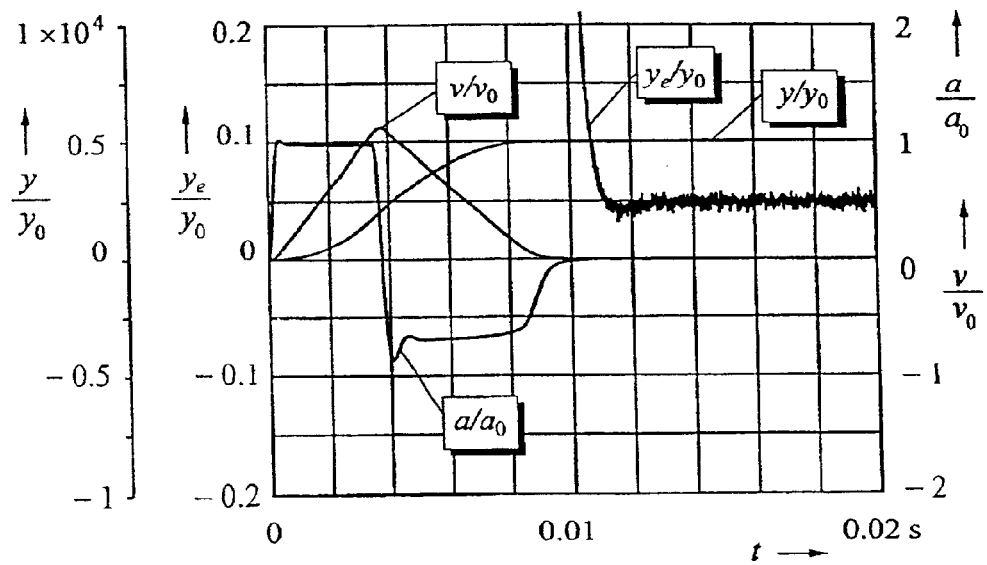
FIG. 8(a) shows the control performance with a current loop.
Figure 8B:
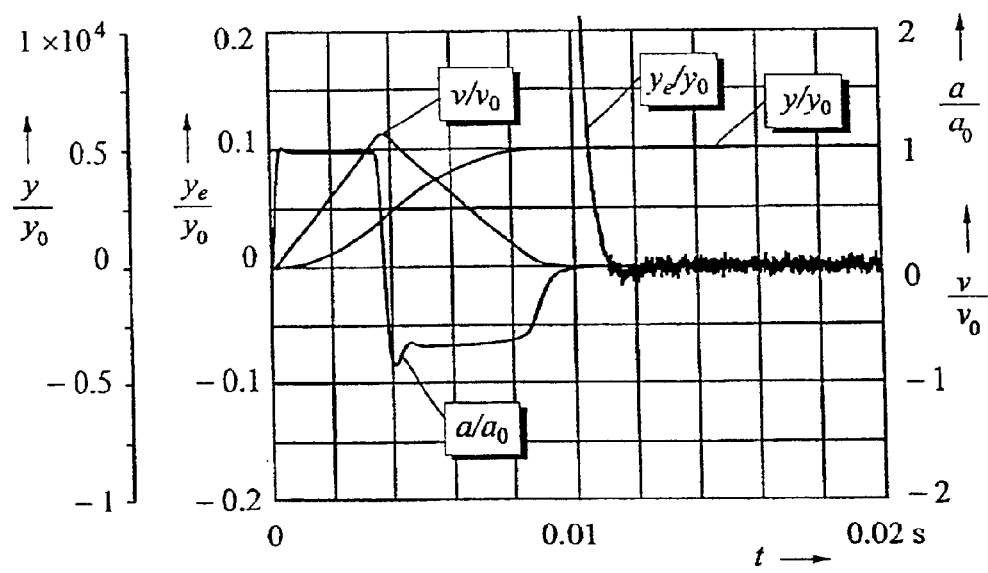
FIG. 8(b) shows the control performance with an acceleration loop.
Figure 9A:
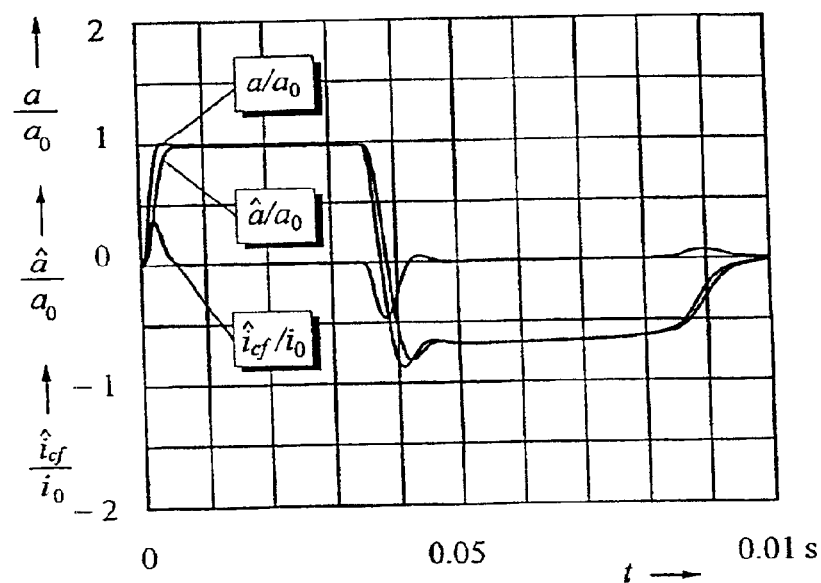
FIG. 9(a) shows actual acceleration $(a/_{a0})$, estimated acceleration $(\hat{a}/_{a0})$ and the current $(\hat{i}_{cf}/i_0)$ for feedback.
Figure 9B:
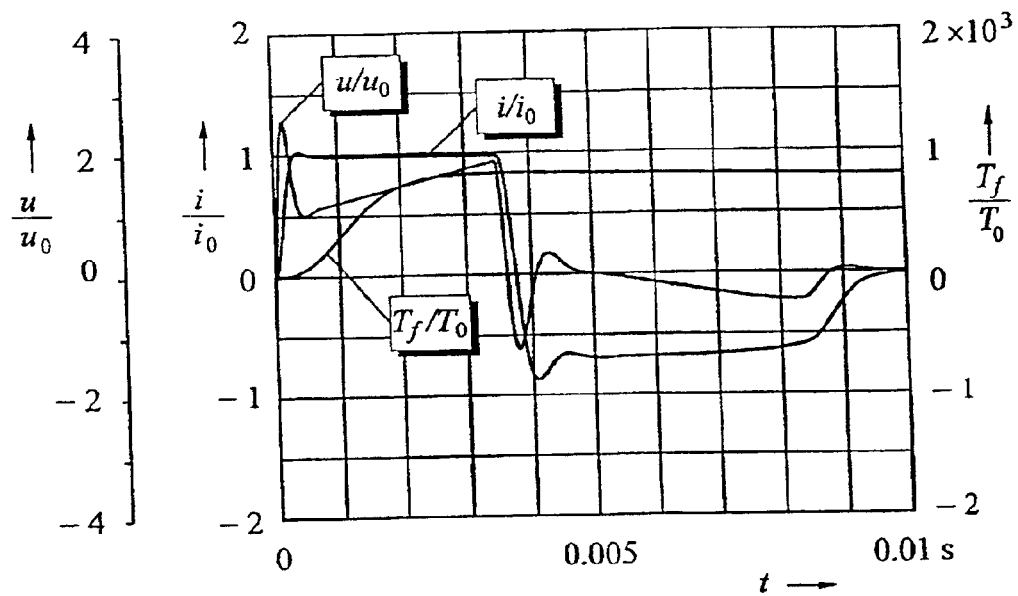
FIG. 9(b) shows voltage $(u/u_0)$, current $(i/i_0)$ and friction torque $(T_f/T_0)$.
Figure 10A:
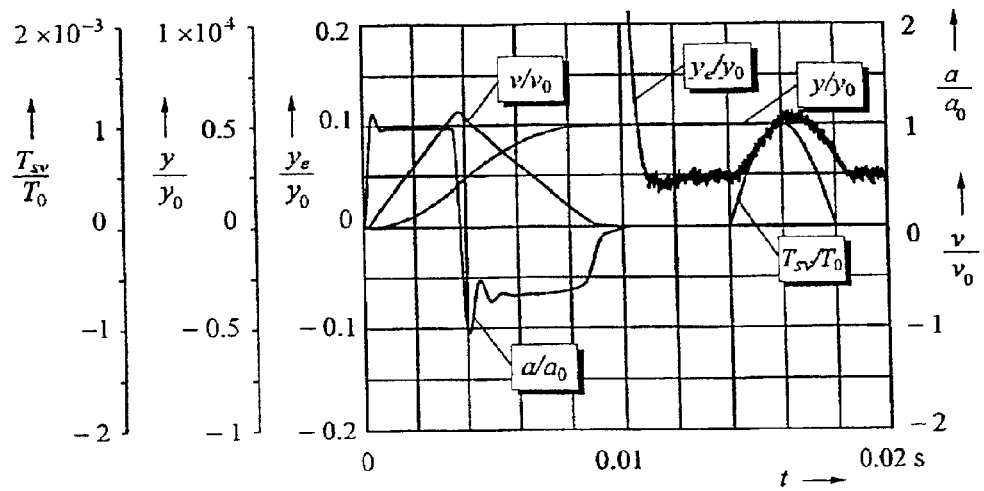
FIG. 10(a) illustrates the results using a current loop.
Figure 10B:
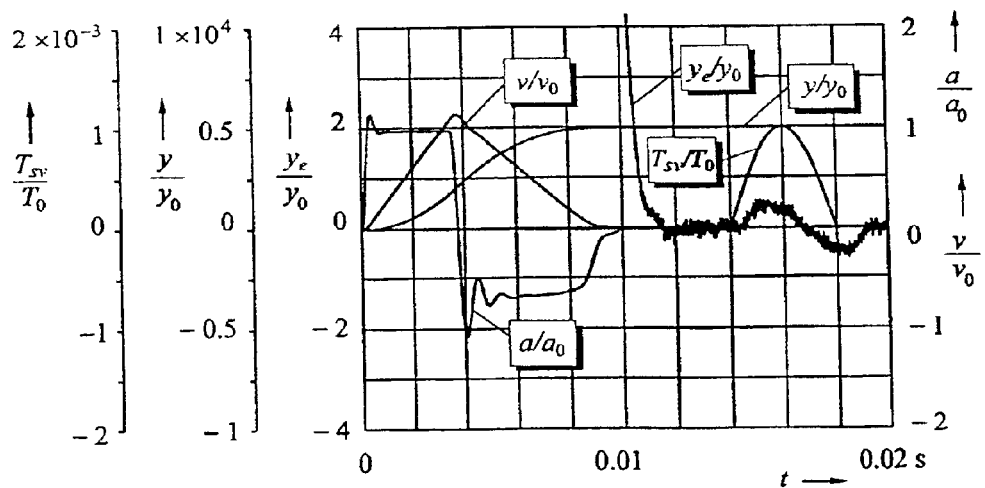
FIG. 10(b) illustrates the results using an acceleration loop.
Figure 11A:
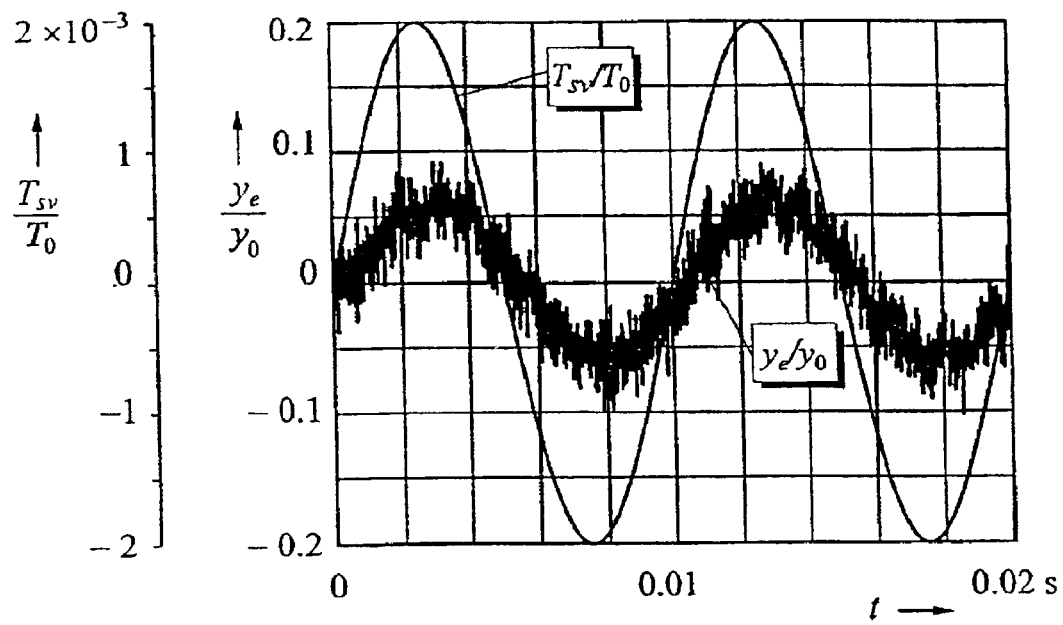
FIG. 11(a) illustrates the results using a current loop.
Figure 11B:
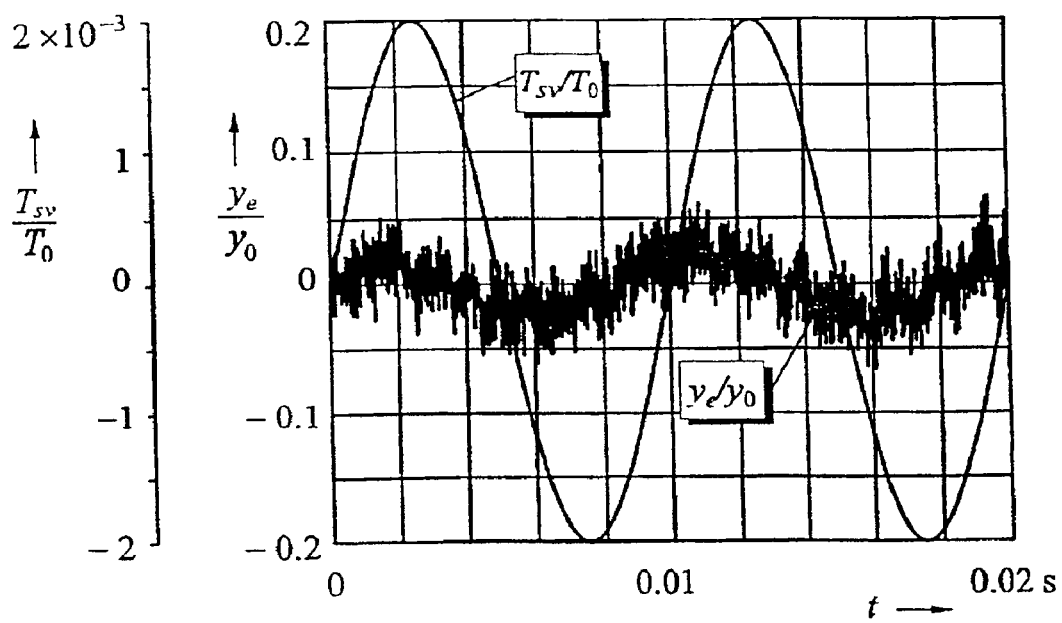
FIG. 11(b) illustrates the results using an acceleration loop.

As shown in FIG. 7(a), the decrease of system gain in the low-frequency range due to friction is improved by the acceleration feedback control, where the acceleration control loop is designed as a type-I servo system. The acceleration feedback introduces a turndown in the high-frequency range that does not impact system performance, which is mainly determined by the outer speed and position loops working in relative low-frequency ranges. FIG. 7(b)

also shows that the system error due to the disturbance torque is decreased by the acceleration control loop. The traces in FIG. 8(a) are the step responses of position, velocity, acceleration and system positioning error when the actuator follows a step of 5000 tracks. There exists a steady position error of about 0.05 $y_0$. The improvement by the acceleration loop is shown in FIG. 8(b), where the steady position error is almost zero. The traces in FIG. 9(a) show the responses of the current, the estimated acceleration, and the actual acceleration. The roles played by feedback acceleration and feedback current are shown clearly in this plot. The traces in FIG. 9(b) are voltage, current and the friction torque. FIGS. 10(a) and 10(b) demonstrate the results of attenuating external vibration in the present invention. The disturbance torque is simulated as a sinusoidal vibration with a frequency of 100 Hz. FIGS. 11(a) and 11(b) demonstrate the results of attenuating an external shock in the present invention.

The forgoing description of the preferred embodiment of the invention has been presented for the purpose of illustration and description. It is not intended to be exhaustive or to limit the invention to the precise form disclosed. Many modifications and variations are possible in the light of above teaching. For example, if a velocity sensor is available or the velocity signal from the state observer is used, the acceleration soft sensor can be constructed with the velocity signal instead of the position signal by a first-order filter. Correspondingly Equation (17) and Equation (18) now become:

$$G_a(s) = \frac{1}{t_a s + 1}, \tag{23}$$

$$\frac{\hat{a}}{a_0} = \frac{t_\omega}{t_a} \frac{t_a s}{t_a s + 1}\left(\frac{v}{v_0}\right) = G_a(s)\left(\frac{a}{a_0}\right), \tag{24}$$

and FIG. 4(a) should be modified accordingly. For another example, if the flexibility of the actuator arm is considered, then either the value of the turn-over frequency of the acceleration estimator $1/t_a$ is designed to be less than the lowest resonance frequency of the arm, or notch filters are used to compensate for mechanical resonance. It is intended that the scope of the invention be limited not by the above detailed description of the preferred embodiment of the invention, hard disk drives, but rather by the claims appended hereto.

What is claimed is:

1. A method to attenuate the influence of disturbances including both internal disturbance and external disturbance for a servomechanism having a moveable actuator, a servo motor to provide output torque for positioning said actuator relative to a target position, a servo control mechanism including a power amplifier that provides a command voltage signal to said servo motor, said servo control mechanism further including an actuator position sensor that generates a position signal and a position controller that generates a command signal to said power amplifier, a servo motor current sensor that provides a current signal, a velocity sensor or a state observer to provide a velocity signal, an acceleration sensor that provides the acceleration of said actuator, an acceleration controller, and an acceleration feedback control loop, said method comprising:

selecting a separation frequency;

estimating the acceleration of said actuator from at least one of said current signal, said velocity signal and/or said position signal in the low-frequency range below said separation frequency, providing an estimated acceleration feedback to said acceleration feedback control loop, and providing a current feedback from said current signal in the high-frequency range above said separation frequency, said low frequency range and said high frequency range being separated by said separation frequency;

attenuating said disturbances in said acceleration feedback control loop; and generating a command voltage signal from said acceleration controller in response to a difference between said command signal to said acceleration feedback control loop and said acceleration feedback.

2. The method to attenuate the influence of disturbances according to claim 1, wherein said estimating acceleration step comprises separating said acceleration feedback from said current feedback in frequency domain to construct a feedback control loop.

3. The method to attenuate the influence of disturbances according to claim 1, wherein said current signal is a current measurement of actual current signal of said servo motor, or a reference current from the output of the position controller, said reference current being an approximation of the actual current signal, or a signal which provides an approximation of the actual current signal.

4. The method to attenuate the influence of disturbances according to claim 1, wherein said acceleration sensor comprises a soft acceleration sensor that obtains said acceleration by indirect measurement using a software algorithm or a hardware set which receives at least one of current and position signal as an input from said servomechanism.

5. The method to attenuate the influence of disturbances according to claim 4, wherein said soft acceleration sensor determines acceleration without using derivative and/or differentiation of position signal and/or velocity signal.

6. A disturbance attenuating system incorporated in a servomechanism having a moveable actuator, a servo motor to provide output torque for positioning said actuator relative to a target position, a servo control mechanism including a power amplifier that provides a command voltage signal to said servo motor, said servo control mechanism further including an actuator position generator that generates an actuator position signal and a position controller that generates the command voltage signal to said power amplifier, a velocity sensor or a state observer to provide a velocity signal and/or position signal to said position controller, and an actuator motor current sensor that provides an actuator current signal, the system comprising:

an acceleration estimator that provides an acceleration signal of said actuator without using accelerometer hardware;

an acceleration feedback control loop to attenuate said disturbances; and an acceleration controller in said acceleration feedback control loop to manipulate the operation of said acceleration feedback control loop, wherein said acceleration estimator estimates acceleration without using derivative and/or differentiation.

7. The disturbance attenuating system according to claim 6, wherein said acceleration feedback control loop comprises:

estimated acceleration feedback in a low frequency range; and current feedback in a high frequency range.

* * * * *

UNITED STATES PATENT AND TRADEMARK OFFICE
CERTIFICATE OF CORRECTION

PATENT NO. : 6,876,168 B1
DATED : April 5, 2005
INVENTOR(S) : Lou, Yaolong et al.

It is certified that error appears in the above-identified patent and that said Letters Patent is hereby corrected as shown below:

<u>Title page,</u>
Item [12], "Luo et al" should read -- Lou et al --;
Item [75], Inventor, "Yaolong Luo" should read -- Yaolong Lou --.

Signed and Sealed this

Sixteenth Day of August, 2005

JON W. DUDAS
*Director of the United States Patent and Trademark Office*